(12) United States Patent
Wiener et al.

(10) Patent No.: US 9,888,046 B2
(45) Date of Patent: Feb. 6, 2018

(54) SYSTEMS, METHODS AND MEDIA FOR IDENTIFYING AND ASSOCIATING USER DEVICES WITH MEDIA CUES

(71) Applicant: Avaya. Inc., Santa Clara, CA (US)

(72) Inventors: Yair Wiener, Herzliya (IL); Sagee Ben-Zedeff, Givatayim (IL); Sharon Noiboar, Givatayim (IL)

(73) Assignee: Avaya Inc., Basking Ridge, NJ (US)

( * ) Notice: Subject to any disclaimer, the term of this patent is extended or adjusted under 35 U.S.C. 154(b) by 92 days.

(21) Appl. No.: 13/774,610

(22) Filed: Feb. 22, 2013

(65) Prior Publication Data

US 2013/0166742 A1 Jun. 27, 2013

Related U.S. Application Data

(62) Division of application No. 12/502,380, filed on Jul. 14, 2009, now Pat. No. 8,407,287.

(51) Int. Cl.
| | |
|---|---|
| *G06F 15/173* | (2006.01) |
| *H04L 29/06* | (2006.01) |
| *H04L 12/26* | (2006.01) |
| *H04L 12/18* | (2006.01) |
| *H04L 12/58* | (2006.01) |
| *H04N 7/14* | (2006.01) |
| *H04N 7/15* | (2006.01) |

(52) U.S. Cl.
CPC ...... *H04L 65/1093* (2013.01); *H04L 12/1827* (2013.01); *H04L 43/00* (2013.01); *H04L 51/36* (2013.01); *H04N 7/147* (2013.01); *H04N 7/152* (2013.01)

(58) Field of Classification Search
CPC .... H04W 4/08; H04L 12/1818; H04L 12/589; H04L 12/1827; H04L 43/00; H04L 51/36; H04L 65/1093; H04M 1/67; H04M 1/675; H04M 1/7253; H04M 2250/62; H04M 3/382; H04M 3/56; H04N 7/152; H04N 7/155; H04N 7/141; H04N 7/147
See application file for complete search history.

(56) References Cited

U.S. PATENT DOCUMENTS

| | | | |
|---|---|---|---|
| 2005/0093868 A1 | 5/2005 | Hinckley | |
| 2007/0071203 A1* | 3/2007 | Boyer et al. | 379/158 |
| 2007/0124756 A1 | 5/2007 | Covell et al. | |
| 2008/0320089 A1 | 12/2008 | Jung et al. | |
| 2009/0210491 A1* | 8/2009 | Thakkar et al. | 709/204 |

OTHER PUBLICATIONS

International Search Report; PCT/IB2010/02013; dated Nov. 1, 2011, 3 pgs.

* cited by examiner

*Primary Examiner* — Ryan Jakovac

(57) ABSTRACT

Systems, methods, and media for identifying and associating user devices with media cues are provided. In some embodiments, a plurality of data streams from a plurality of endpoints is received. At least one media segment is then received from a user device. It is determined whether the at least one media segment from the user device corresponds with one of the plurality of data streams from the plurality of endpoints. In response to being unable to match the at least one media segment, a media cue is inserted into one of the plurality of data streams. In response to detecting that the media cue in that data stream is received by the user device, identification information is transmitted to the user device that associates the user device with one or more services on a communications server.

10 Claims, 5 Drawing Sheets

SYSTEMS, METHODS AND MEDIA FOR IDENTIFYING AND ASSOCIATING USER DEVICES WITH MEDIA CUES

This application is a divisional application of U.S. patent application Ser. No. 12/502,380, filed Jul. 14, 2009, by Yair Weiner, Sagee Ben-Zedeff, and Sharon Noiboar, entitled "Systems, Methods, and Media for identifying and Associating User Devices with Media Cues", the entire content of which is specifically incorporated herein by reference for all that it discloses and teaches.

TECHNICAL FIELD

The present invention relates to systems, methods, and media for identifying and associating user devices with media cues. More particularly, the present invention relates to systems, methods, and media for identifying a user device by inserting a media cue into a data stream and detecting or decoding the media cue to associate the user device with a service or services on a server.

BACKGROUND

With the advent of unified communications (UC), servers have been developed that integrate different forms of communication services, such as wireline telephony, cellular telephony, e-mail, instant messaging, voicemail, video conferencing, etc. For example, a unified communications server allows a user to transmit a message to a recipient through an e-mail, where the recipient receives the message over a cellular telephone. In another example, a unified communications server allows the initiation and support of a video conference using instant messaging.

Despite these advances, unified communications servers or any other suitable servers are unable to provide users with control over these services, without the use of dedicated appliances or tools, such as remote controls or keypads, or by connecting to the service's web interface over an Internet Protocol (IP) communications network or any other suitable communications network. For example, to configure and/or control a conference, a user using an external computer (which may be running call control software) can access the unified communications server by logging in and entering a password at a web interface.

In addition to the limitation described above, unified communications servers are also unable to provide personal data to a participant that is sharing a communications terminal with other participants. For example, a party sitting in a conference room that is sharing a video conferencing room system might be interested in communicating over a chat channel to another party in the conference from his or her mobile device.

Even further, although mobile devices, such as personal digital assistants (PDAs), cellular telephones, portable media players, and other devices can be used as endpoints in a conference, actual fixed-to-mobile convergence is not yet available. That is, a participant in a conference wishing to conference his or her mobile device cannot seamlessly do so without knowing the conference details or accessing the service operational interface. Typically, a user either accesses the web interface of the service and dials his or her mobile device access number or uses dual-tone multi-frequency (DTMF) signals and/or similar approaches to remotely instruct the server to invite the mobile device. Alternatively, the user can also choose to dial in to the conference provided he or she is aware of the conference details, such as, for example, the conference access number, the conference number, a personal identification number (PIN), etc.

Accordingly, it is desirable to provide systems, methods, and media for identifying and associating user devices with media cues that overcome these and other deficiencies of the prior art.

SUMMARY

Mechanisms for identifying and associating user device with media cues are provided.

In accordance with some embodiments, a method for identifying and associating user devices is provided. The method comprises: receiving a plurality of data streams from a plurality of endpoints; receiving at least one media segment from a user device; determining whether the at least one media segment from the user device corresponds with one of the plurality of data streams from the plurality of endpoints; in response to being unable to match the at least one media segment, inserting a media cue into one of the plurality of data streams; and, in response to detecting that the media cue in that data stream is received by the user device, transmitting identification information to the user device that associates the user device with one or more services on a communications server.

In accordance with some embodiments, a method for identifying and associating user devices is provided. The method comprises: receiving a media segment captured using a user device, wherein the media segment is at least a portion of media displayed by an endpoint; determining that the received media segment includes a media cue; deciphering the media cue from the media stream; and in response to deciphering the media cue, determining identification information associated with the deciphered media cue for communications with a communications server, wherein the identification information associates the user device with one or more services on the communications server.

It should be noted that the media cues can be, for example audio cues, video cues, an audio watermark, a video watermark, and/or a portion of the media stream itself.

In accordance with some embodiments, a system for identifying and associating user devices is provided. The system comprises: a processor that: receives a plurality of data streams from a plurality of endpoints; receives at least one media segment from a user device; determines whether the at least one media segment from the user device corresponds with one of the plurality of data streams from the plurality of endpoints; in response to being unable to match the at least one media segment, inserts a media cue into one of the plurality of data streams; and, in response to detecting that the media cue in that data stream is received by the user device, transmits identification information to the user device that associates the user device with one or more services on a communications server.

In accordance with some embodiments, a system for identifying and associating user devices is provided. The system comprises: receives a media segment captured using a user device, wherein the media segment is at least a portion of media displayed by an endpoint; determines that the received media segment includes a media cue; deciphers the media cue from the media stream; and in response to deciphering the media cue, determines identification information associated with the deciphered media cue for communications with a communications server, wherein the identification information associates the user device with one or more services on the communications server.

In accordance with some embodiments, a non-transitory computer-readable medium containing computer-executable instructions that, when executed by a processor, cause the processor to perform a method for identifying and associating user devices is provided. The method comprises: receiving a plurality of data streams from a plurality of endpoints; receiving at least one media segment from a user device; determining whether the at least one media segment from the user device corresponds with one of the plurality of data streams from the plurality of endpoints; in response to being unable to match the at least one media segment, inserting a media cue into one of the plurality of data streams; and, in response to detecting that the media cue in that data stream is received by the user device, transmitting identification information to the user device that associates the user device with one or more services on a communications server.

In accordance with some embodiments, a non-transitory computer-readable medium containing computer-executable instructions that, when executed by a processor, cause the processor to perform a method for identifying and associating user devices is provided. The method comprises: receiving a media segment captured using a user device, wherein the media segment is at least a portion of media displayed by an endpoint; determining that the received media segment includes a media cue; deciphering the media cue from the media stream; and in response to deciphering the media cue, determining identification information associated with the deciphered media cue for communications with a communications server, wherein the identification information associates the user device with one or more services on the communications server.

DETAILED DESCRIPTION

In accordance with various embodiments, systems, methods, and media for associating and identifying user devices with media cues are provided.

In some embodiments, mechanisms are provided that use media transmitted between a server, such as a conference server or a unified communication server, and multiple client computers, such as endpoints, to identify and associate devices used by service users. The identification and association allows service users to communicate with the server. The communications with the server can include, for example, service control, transmission of personalized data to the service user, fixed-to-mobile convergence, etc.

For example, based on data exchanged between a particular device and the server, these mechanisms can be used to identify a device and associate the device with a specific service or services on a particular server, thereby allowing the device to perform a task using the specific service and/or any other task from the device.

In another example, these mechanisms can include an application on the device that communicates with a server application (e.g., running on the conference server or on a dedicated server) in order to identify the device and associate it with a specific service or services on a particular server.

In some embodiments, these mechanisms use media cues to identify a device without the need for external and/or additional logging by the user of the device. That is, a physical or logical connection between a user device and a service or a session on the server is not needed. Information received from the device, such as identification information from a decoded media cue or identification information from correlating a media clip with a particular data stream, can be used to associate a device with a service or services on the server. For example, a device can obtain identification information from a captured media clip and use the identification information when communicating with a server.

These mechanisms can be used in a variety of applications. For example, a conference server can be provided that uses media cues (e.g., audio cues and/or video cues) to identify a device and allow that device to access particular controls, such as conference controls, on the server. In another example, a conference server can be provided that uses media cues to identify a device without the need for external and/or additional logging by the user of the device. In response to identifying the device, the conference server can transmit personalized data to the device. Personalized data can include, for example, off-the-record chats, personal information on conference participants, etc.

Figure 1:
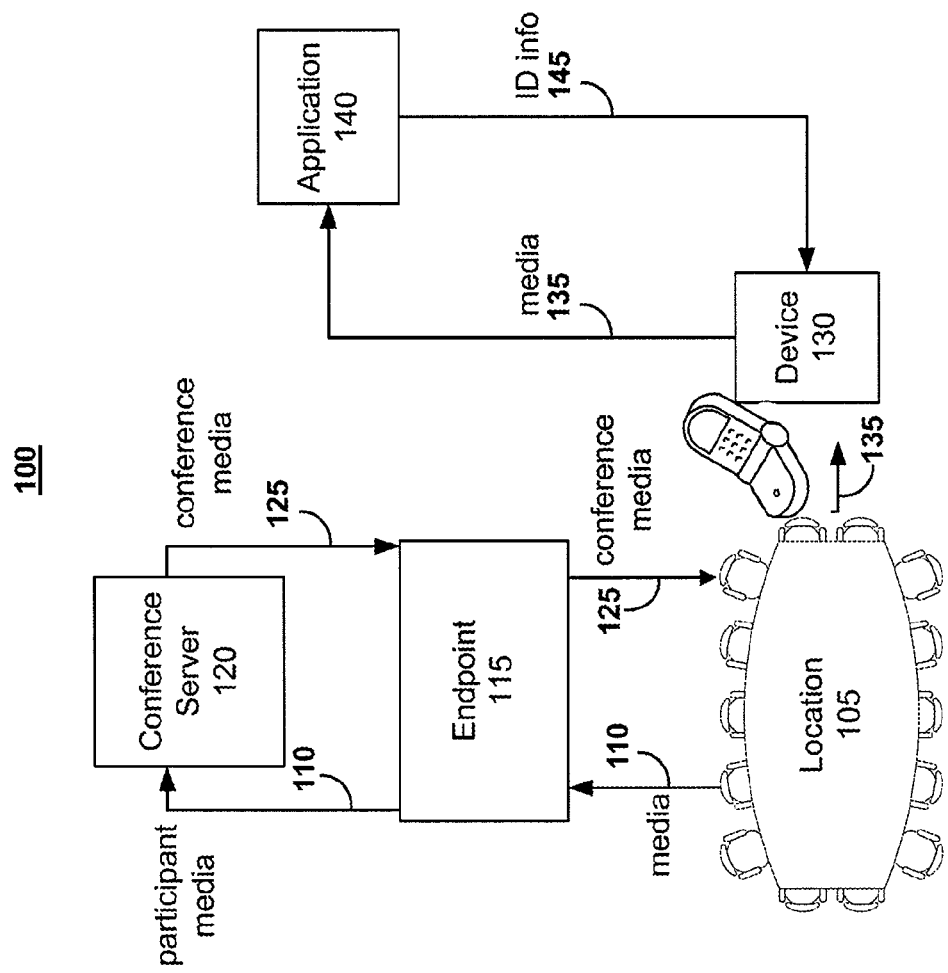
FIG. 1 illustrates a system suitable for implementing an application that associating and identifying user devices in accordance with some embodiments of the present invention.

Turning to FIG. 1, system 100 that can be used to implement the user device association and identification mechanisms as described herein in accordance with some embodiments of the present invention is provided. As shown, system 100 can include one or more locations 105, where each location has at least one client computer or an endpoint 115 that transmits a data stream 110 to a conference server 120. Data stream 110 can include, for example, one or more video streams, one or more audio streams, streams showing a whiteboard, streams showing chat messages, and/or any other suitable types of data streams.

Endpoint 115, such as a video conferencing endpoint, can be any suitable device for providing an endpoint. For example, endpoint 115 can be a dedicated endpoint device, a personal computer running suitable software (e.g., video conferencing software), a telephone providing an audio stream, a mobile telephone, a personal data assistant, an e-mail device, and/or various other suitable devices that can be used to participate in a conference. In some embodiments, the functionalities that are necessary to participate in a video conference are built into endpoint 115. In some embodiments, endpoint 115 can add some of the functionalities needed to participate in a video conference by interfacing with peripheral devices capable of providing such functionalities (e.g., connecting to a video camera to provide a video stream of the conference, attaching a microphone to provide an audio stream of the conference, etc.).

The one or more endpoints 115 can be any suitable device for accessing content and/or interfacing with conference server 120. The one or more endpoints 115 can be systems owned, operated, and/or used by universities, usinesses, governments, non-profit organizations, families, individuals, and/or any other suitable person and/or entity. In addition, the one or more endpoints can include any number of user computers, servers, firewalls, routers, switches, gateways, wireless networks, wired networks, and/or any other suitable devices. The one or more endpoints 115 can run programs, such as operating systems (OS), software applications, a library of functions and/or procedures, background daemon processes, and/or various other suitable programs. Any number (including only one) of endpoints 115 and any number (including only one) of conference server 120 can be present in system 100, and each endpoint 115 and/or conference server 120 can be identical or different.

More particularly, for example, each of the one or more endpoints 115, conference server 120, and device 130 can be any of a general purpose device, such as a computer, or a special purpose device, such as a client, a server, etc. Any of these general or special purpose devices can include any suitable components, such as a processor (which can be a microprocessor, digital signal processor, a controller, etc.), memory, communication interfaces, display controllers, input devices, etc. For example, endpoint 115 can be implemented as a personal computer, a personal data assistant (PDA), a portable email device, a multimedia terminal, a mobile telephone, a set-top box, a television, etc.

One or more endpoints 115 can communicate with conference server 120 over a communication network. Conference server 120 can be any suitable server for communicating with and/or providing services to one or more endpoints 115. For example, although server 120 is generally described herein as a conference server, server 120 can be a transcoding server, an archiving server, a gateway, a multimedia gateway, a multipoint conferencing unit (MCU), a network video recorder, a private branch exchange (PBX), or any other suitable device for providing services.

As described in further detail below, in some embodiments, conference server 120 can insert media cues (e.g., an audio cue, a video cue, an audio water mark, a video Watermark, etc.) into one of the outgoing data streams to one or more of endpoints 115. For example, to verify the identification of a device, such as device 130, conference server 120 can determine and/or predict the particular data stream that is being transmitted to a particular endpoint 115 and that is being captured by device 130 and insert a media cue into that data stream. In response to receiving the media cue through the particular data stream captured by device 130, conference server 120 can authenticate device 130 and transmit identification information (e.g., a service/user ID, a user identification number, a service identification number, etc.) to device 130 that associates device 130 with a particular service or services on conference server 120. In addition to identifying device 130 and associating device 130 with one or more services on conference server 120, conference server 120 can provide device 130 with access to and/or control of one or more services (e.g., conferencing, transcoding, archiving and/or retrieval, etc.).

The communication network can be any suitable network for facilitating communication among endpoints 115 or client computers, conference server 120, device 130, etc. The communication network can include any suitable communication network, such as the Internet, a local area network (LAN), a wide area network (WAN), a wired network, a wireless network, a telephone communication system, a cable television system, a satellite communication system, any other suitable networks or systems, and/or any combination of such networks and/or systems.

System 100 can also include communication links between the various endpoints 115, conference server 120, device 130, etc. Communication links can be any suitable mechanism for connecting one or more endpoints 115, conference server 120, and device 130 to the communication network. For example, communication links can be any suitable wired or wireless communication link such as a T1 or T3 connection, a cable modem connection, a digital subscriber line connection, a Wi-Fi or 802.11(a), (b), (g), or (n) connection, a Bluetooth connection, a dial-up connection, and/or any other suitable communication link. Alternatively, communication links can be omitted from system 100 when appropriate, in which cases one or more endpoints 115, conference server 120, and device 130 can be connected directly to the communication network.

Figure 2:
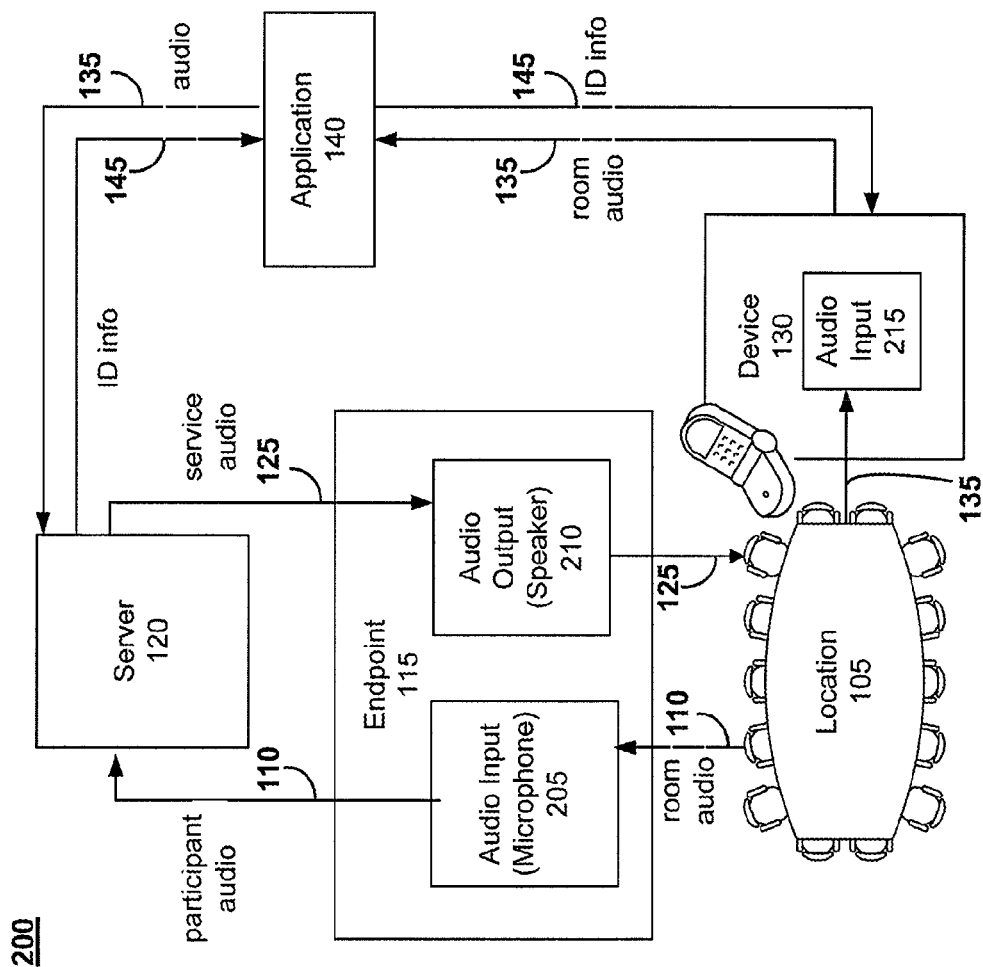
FIG. 2 illustrates a system suitable for implementing an application that associating and identifying user devices using audio cues in accordance with some embodiments of the present invention.
Figure 3:
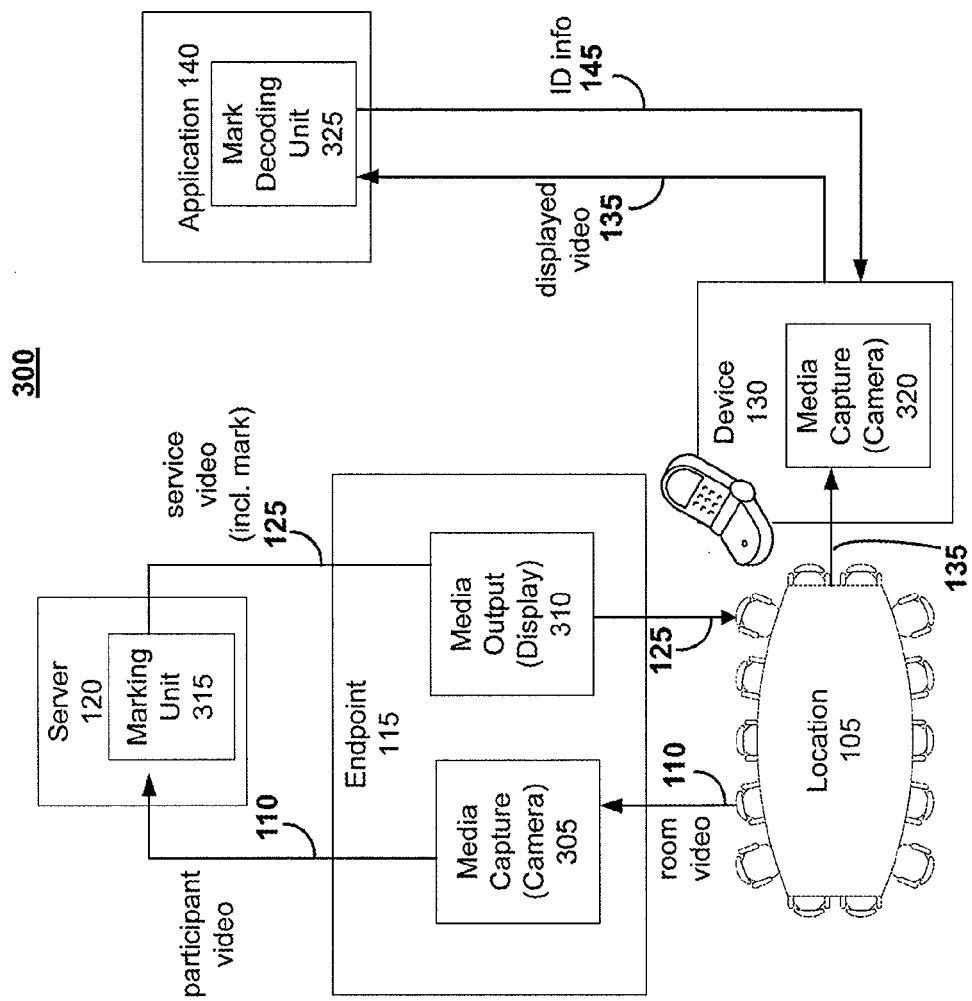
FIG. 3 illustrates a system suitable for implementing an application that associating and identifying user devices using video cues in accordance with some embodiments of the present invention.

It should be noted any number of endpoints can be present at location 105 and any number of endpoints 115 can communication with conference server 120 in system 100, but only one location 105 and one endpoint 115 is shown in FIGS. 1-3 to avoid overcomplicating the drawing.

As shown in FIG. 1, endpoint 115 communicates with conference server 120. For example, endpoint 115 can connect to conference server 120 by a dial-up telephone call, creating a TCP/IP connection (e.g., via the Internet), etc. Once connected, each endpoint 115 transmits a data stream 110 from location 105. The data stream 110 can include one or more video streams, one or more audio streams, a stream showing a whiteboard, a stream including chat messages, and/or any other suitable type of data stream. For example, a video stream can be generated and captured by endpoint 115 or a video capturing mechanism (e.g., a video camera, a webcam, etc.) connected to endpoint 115 once a user at location 105 begins participating in a video conference using endpoint 115 and can include frames of video. In another example, an audio stream can be generated and captured by endpoint 115 or an audio capturing mechanism (e.g., a microphone) connected to endpoint 115 when the user at location 105 begins speaking.

Conference server 120 receives the data streams from participating endpoints 115 through various communication links and processes the received data streams to create conference data stream 125, which can include any suitable media. For example, conference server 120 can encode, decode, mix, select, switch, and/or perform any other suitable operation on the received data streams. In another example, for each endpoint, conference server 120 can mix particular audio streams from each of the participating endpoints without the audio stream of that particular endpoint. In yet another example, conference server 120 can mix particular data streams from each of the participating endpoints based on the capabilities of that particular endpoint (e.g., the particular endpoint is a cellular telephone with audio capabilities). In yet another example, conference server 120 can mix particular media streams to create a layout that displays the participants of a video conference, where a user of an endpoint does not see a video of himself or herself Accordingly, each participating endpoint 115 receives a conference data stream 125 from conference server 120.

As also shown in FIG. 1, in some embodiments, system 100 can include device 130 that is capable of connecting to conference server 120. Device 130 can be a mobile device, such as a mobile telephone (e.g., a camera-enabled cellular telephone), a personal data assistant (PDA), a portable email device, a portable media player or recorder, etc.

In some embodiments, conference server 120 can identify device 130 or the user of device 130 based on data exchanged between device 130 and conference server 120. For example, as shown in FIG. 1, device 130 can capture the conference data stream 125 that is displayed by endpoint 115 in the form of a media clip 135 (e.g., using the microphone on a cellular telephone, using the camera on a cellular telephone, etc.). It should be noted that, in some embodiments, device 130 can capture a portion of the conference data stream 125 that is presented by endpoint 115, such as an audio portion using a microphone and not collecting a video portion of the data stream. An application 140 rumling on device 130 can extract, from the media clip 135 of conference data stream 125, the service/user identification information, the user identification information, and/or service identification information 145 to be used to identify the user of device 130 and/or device 130 itself Alternatively, device 130 can transmit the captured conference data stream to conference server 120 or any other suitable server for identification. For example, conference server 120 can correlate the data stream received from device 130 with a data stream received by a particular endpoint 115. In another example, conference server 120 can insert a media cue into one or more conference data streams and, in response to detecting the media cue, identify device 130 or the user of the device 130.

In some embodiments, device 130 can analyze the captured conference data stream to generate or obtain a signature of the captured conference data stream. Device 130 can then transmit the signature of the captured conference data stream to conference server 120 or any other suitable server for identification. For example, conference server 120 can include a database or any other suitable storage device that includes the signatures for each data stream transmitted from conference server 120, received by conference server 120, etc. In response to receiving the signature of the captured conference data stream from device 130, conference server 120 can match the signature of the captured conference data stream with one of the signatures stored in the database.

For example, as shown in FIG. 2, an audio-based system 200 that can be used to implement the user device association and identification mechanisms as described herein in accordance with some embodiments of the present invention is provided. As shown, system 200 includes an endpoint 115 that has an audio input 205, such as a microphone, and an audio output 210, such as a speaker.

To identify and associate device 130, which has an audio input 215, device 130 collects an audio stream 135 transmitted from audio output 210 of endpoint 115 or generated by local users at location 105. For example, the microphone or any other suitable audio input 215 of device 130 records an audio clip 135 from the audio being received and outputted by the speakers of endpoint 115. In another example, the microphone or any other suitable audio input 215 of device 130 records an audio clip 135 of the sounds generated by users present at location 105. In yet another example, the microphone or any other suitable audio input 215 of device 130 records an audio clip 135 of the audio being received and outputted by the speakers of endpoint 115 and the sounds generated by users present at location 105. The audio clip 135 or any other suitable portion of the received audio at endpoint 115 can be transmitted to conference server 120. For example, application 140 can transmit audio clip 135 to conference server 120.

In response to receiving audio clip 135, conference server 120 can correlate the audio clip 135 received from device 130 with a data stream received by a particular endpoint 115 or transmitted to a particular endpoint 115. Alternatively, conference server 120 can correlate the audio clip 135 with a data stream received from a particular endpoint 115. In response to matching audio clip 135 with a particular data stream, conference server 120 can transmit identification information (e.g., a service/user ID, user identification information, server identification information, etc.) to device 130. Such identification information can be used by device 130 to serve as identification in communications with conference server 120.

It should be noted that, in some embodiments, device 130 transmits the entire audio stream 125 as outputted by audio output 210 of endpoint 115. In some embodiments, device 130 transmits the entire audio stream 125 as outputted by audio output 210 of endpoint 115 to conference server 120 and conference server 120 samples a segment of audio stream 125. Alternatively, in some embodiments, device 130 transmits a segment or portion of audio stream 125, such as audio clip 135. As described previously, in some embodiments, device 130 can transmit a signature of audio stream 125 that represents the captured audio stream outputted by an endpoint or by users at a particular location.

In some embodiments, conference server 120 can validate the identification and/or association of device 130 using media cues. For example, conference server 120 can insert a specific audio cue or any other suitable watermark into a particular data stream. In response to receiving the audio cue on device 120, conference server 120 confirms the identification and/or assignment.

In some embodiments, these mechanisms for identifying and associating user devices can be implemented on a video-based system. For example, as shown in FIG. 3, a video-based system 300 that can be used to implement the user device association and identification mechanisms as described herein in accordance with some embodiments of the present invention is provided. As shown, system 300 includes an endpoint 115 that has a media capturing component 305, such as a video camera, a web camera, or a video conference room system that includes a camera, and a media output component 310, such as a projector, a liquid crystal display, or a display on endpoint 115. As also shown in system 300, conference server 120 can include a marking component 315. Marking component 315 can be used to insert media cues (e.g., an audio cue, a video cue, an audio watermark, a video watermark, etc.) into a particular data stream transmitted to a particular endpoint 115.

To identify and associate device 130, which also has a media capturing component 320 (e.g., a camera on a cellular telephone), device 130 collects a media clip 135 and/or the conference transmitted from audio output 210 of endpoint 115. For example, the camera or any other suitable media capturing component 320 of device 130 records a video clip 135 from the media being received and outputted by the display of endpoint 115. Application 140, which can include a decoding component 325, can decipher or decode the received video dip to obtain identification information (e.g., a service/user ID, user identification information, server identification information, etc.). Such identification information can be used by device 130 to serve as identification in communications with conference server 120.

For example, conference server 120 or any other suitable server can embed a code into a data stream. The code can be, for example, a two-dimensional code, a bar code, a QR code, a matrix code, or any other suitable machine-readable code.

In another example, conference server 120 can transmit embedded codes continuous within the data stream or can transmit an embedded code in response to receiving an identification request from a particular device 130.

After identifying device 130 and/or identifying the particular user of device 130 (e.g., a service user), conference server 120 can associate the user and/or the device with particular services on a particular server. For example, conference server 120 can allow the user of device 130 to control the conference managed by conference server 120 (e.g., changing a displayed layout in a conference, muting particular participants in a conference, etc.). In addition to providing device 130 with particular services, conference server 120 can transmit personal data to device 130. Personal data can include, for example, user preferences or off-the-record messages from other users.

It should be noted that, in some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 4:
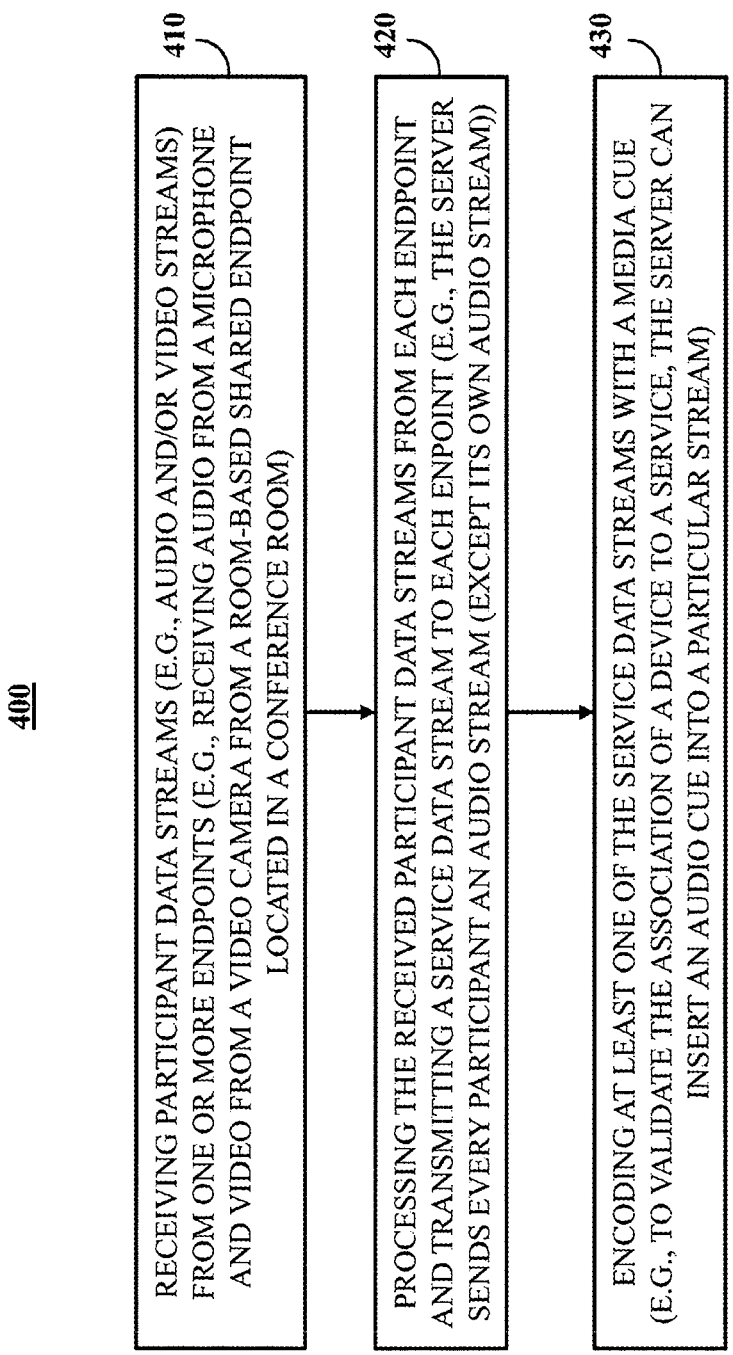
FIG. 4 illustrates a mechanism for receiving and processing data streams from one or more endpoints and encoding media cues into the media streams in accordance with some embodiments of the present invention.
Figure 5:
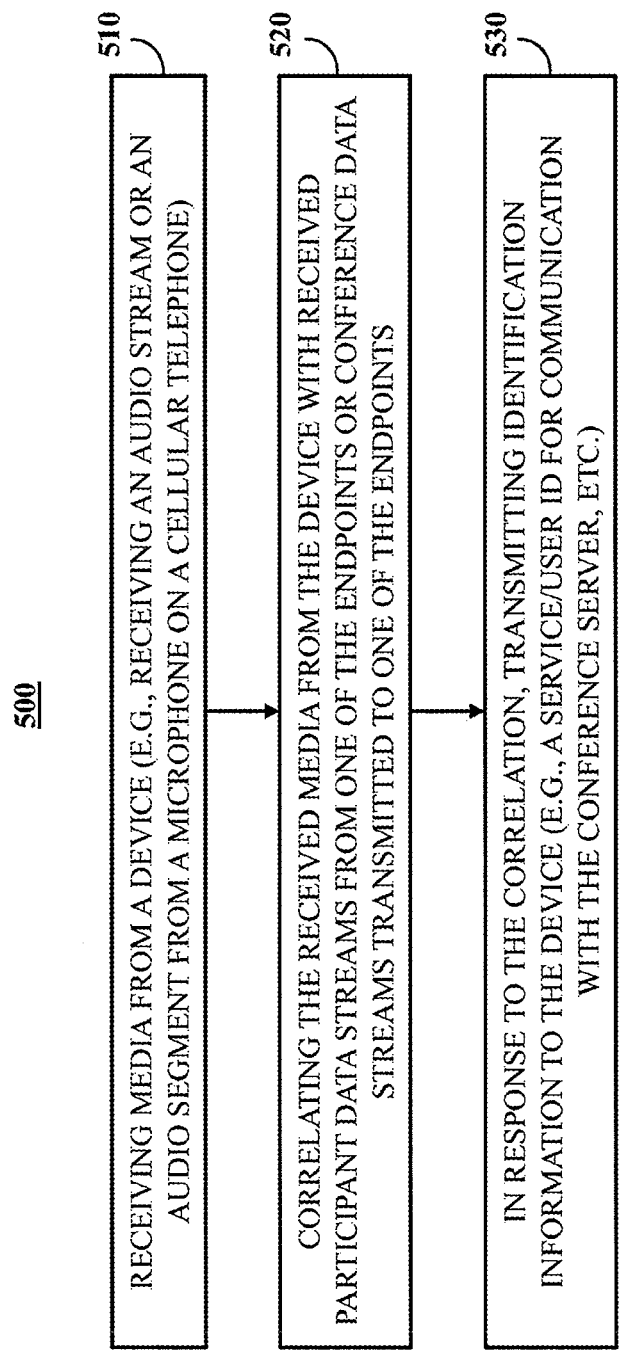
FIG. 5 illustrates a mechanism for correlating media clips with a data stream and using identification information to associate a user device with a service on a server in accordance with some embodiments of the present invention.

FIGS. 4 and 5 illustrate a process for identifying and associating user devices with a service on a server in accordance with some embodiments of the present invention. As shown, beginning at 410, process 400 receives participant data streams from multiple endpoints. For example, a conference server can receive an audio stream from a participant using a cellular telephone, a video stream from a personal computer running a video conferencing application, and a video stream from a video conferencing room system in a conference room.

At 420, the received participant data streams can be processed and service data streams or conference data streams are transmitted to each endpoint. For example, a conference server receives the data streams from participating endpoints and processes the received data streams, which can include any suitable combination of encoding, decoding, mixing, transcoding, selecting, switching, and/or performing any other suitable operation on the received data streams. For each endpoint, the conference server can mix particular data streams or portions of particular data streams from each of the participating endpoints based on, for example, the capabilities of each particular endpoint. In addition, the conference server processes particular data streams from each of the participating endpoints such that the endpoint does not receive video and/or audio from himself or herself Turning to FIG. 5, at 510, media can be received from a device. For example, a camera-enabled cellular telephone can use the camera or any other suitable capturing device to capture a media clip of a data stream provided to a participating endpoint (e.g., the video displayed and audio provided at a room-based conference endpoint).

In some embodiments, the captured media can be transmitted to a conference server, where the conference server determines identification information for the device. For example, at 520, the conference server attempts to correlate the received media (e.g., a video clip, an audio clip, the entire data stream, etc.) with a data stream received from one of the participating endpoints or a data stream transmitted to one of the endpoints connected to it. As shown in FIG. 2, an audio clip of the audio stream outputted by a speaker on an endpoint is captured by a device. In FIG. 3, a video clip that captures the video or images displayed on a display connected to an endpoint and captures the audio outputted by a speaker on the endpoint is obtained using a device, such as a camera-enabled cellular telephone. In response to matching or correlating the received media with a particular data stream from a particular endpoint, the conference server can transmit identification information to the device. The identification information can include, for example, a service/user ID or any other suitable identification information that associates the device or the user of the device with a particular service on the server. The identification information can be used by the device to serve as identification in communications with the conference server.

In some embodiments, the captured media can be transmitted to a conference server, where the conference server attempts to correlate the captured media with a conference data stream transmitted to a participating endpoint. In some embodiments, the conference server can determine whether to correlate the captured media with an incoming participant data stream from an endpoint or an outgoing conference data stream to an endpoint based on, for example, the participant requesting identification and association with a particular service on the server. For example, the conference server can differentiate between users—e.g., a current or active speaker, a moderator or an organizer of a video conference, other participants, a service user, etc.

It should be noted that, in some embodiments, the captured media that is transmitted from the device to a conference server can be sampled or segmented by the conference server. For example, as described previously, the conference server can receive a signature of the captured media that represents the captured media outputted by an endpoint or by users at a particular location. For example, the conference server can include a database or any other suitable storage device that includes the signatures for each data stream transmitted from the conference server, received by the conference server, etc. In response to receiving the signature of the captured media, the conference server can correlate the signature with one of the signatures stored in the database.

Alternatively, the captured media can be analyzed using an application running on the device. For example, the application can evaluate the captured media and determine whether a media cue is embedded or encoded in the captured media. As shown in FIG. 3, an application communicating with the device can decode the captured media to obtain a service/user ID. The application can, for example, decipher a two-dimensional image code embedded in every image or video frame of the captured media. In response, the service/user ID or any other suitable identification information is transmitted to the device, where the identification information can be used by the device to serve as identification in communications with the conference server.

It should be noted that the application that decodes the captured media can be located on a dedicated server or another processing device. In some embodiments, the application is executed on the device itself without involving an external application or without transmitting the captured media to a server or another device.

Referring back to FIG. 4, in some embodiments, at 430, process 400 can encode at least one of the data streams transmitted from the conference server to an endpoint with a media cue. As described previously, the conference server or any other suitable device can insert or embed a cue or watermark into a data stream. The media cue can be, for example, an audio cue, a two-dimensional image code, a bar code, a QR code, a matrix code, or any other suitable media cue. In another example, conference server 120 can transmit embedded codes (watermarks) continuously or intermittently (e.g., in a frame every five seconds) within the data stream or can transmit an embedded code in response to receiving an identification request from a particular device 130.

For example, as shown in FIG. 3, the conference server has a marking or coding application that inserts a media cue into a particular data stream. The particular data stream that includes the media cue is received at a particular endpoint. In response to a device capturing a portion of the media provided from that particular data stream, the captured media can be decoded or deciphered by a decoding application. In response, a service/user ID or any other suitable identification information associated with the decoded media cue is obtained by the device, where the identification information can be used by the device to serve as identification in communications with the conference server.

In another example, as shown in FIG. 2, the conference server can include a marking or coding application that inserts a media cue into a particular data stream to validate the association of a particular device to a particular service. For example, a particular endpoint implements an audio processing mechanism, such as an acoustic echo canceller, and, in response to determining a weak correlation or no match with a particular data stream, the conference server can insert a media cue. In response to receiving the media cue on the device, the conference server can confirm the assignment or association between the particular device and the particular service on the server.

It should be noted that, in some embodiments, the media cue can be transmitted continuously. For example, the conference server or any other suitable device with a marking or coding application can continuously insert media cues into outgoing conference data streams. In particular, each video frame or image in an outgoing conference data stream can include a two-dimensional code. In other embodiments, the media cue can be transmitted at predetermined times. For example, the conference server can insert media cues into outgoing conference data streams every five seconds, once every minute, etc. Alternatively, the media cue can be transmitted in response to receiving an identification request from a device. For example, a device can request access to a particular service on the server and, in response, the conference server transmits a media cue to identify and associate the device with the server.

The identification information, such as a service/user ID, associates a user device with a particular service or services on a server. For example, the user using the user device can control the service (e.g., conferencing features, transcoding features, etc.). In particular, the user device using the identification information can mute the audio of a conference, mute particular participants (e.g., everyone except for the speaker), change the displayed conference layout, change the video conferencing format, etc.

In some embodiments, the identification information can be used to transmit personal data from the conference server to the device. For example, in response to identifying a device, the conference server can transmit off-the-record chat messages, for-your-eyes-only data, messages from other users, messages on a private whiteboard, user preferences, etc. to the device.

In some embodiments, the identification information can be used for fixed-to-mobile convergence features. For example, a user sharing an endpoint with other participants during a video conference can use a device (e.g., a camera-enabled cellular telephone) to communicate with the conference server. Using identification information, the conference server identifies and associates the device with the server. Without disconnecting and/or reconnecting from the video conference and without the user knowing the service and/or server details (e.g., a conference access number, a conference identification number, a personal identification number (PIN), a server access mmlber, etc.), the user using the device can receive a data stream of video and/or audio similar to the data stream received by the shared endpoint. In some embodiments, the user using the device can send a request to the conference server to transmit a data stream to the device. Alternatively, the conference server can automatically transmit a data stream to the device in response to identifying and/or associating the device with the server.

On the other hand, a user currently using a device (e.g., a camera-enabled cellular telephone) to participate in a video conference can, using identification information, request that the conference server transmit a data stream to a shared endpoint (e.g., a conference room system). That is, without disconnecting and/or reconnecting from the video conference and without the user knowing the service and/or server details (e.g., a conference access number, a conference identification number, a personal identification number (PIN), a server access number, etc.), the user using the device can instruct the conference server to transmit a data stream of video and/or audio to the shared endpoint similar to the data stream currently being transmitted to the device.

Accordingly, systems, methods, and media for identifying and associating user devices with media cues are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for identifying and associating user devices in a communications system, said method comprising:

transferring a conference data stream to an endpoint, wherein the endpoint presents media included in the conference data stream to one or more users at a location of the endpoint;

receiving a media clip from a user device at the location, said media clip having been captured by one or more of a camera and a microphone of said user device at said location during presentation of said media by said endpoint;

determining that said received media clip captured a media cue presented in said media by said endpoint, said media cue comprising one of an audio cue, a video cue, an audio watermark, and a video watermark included in at least a portion of said media;

deciphering said media cue; and in response to deciphering said media cue, determining identification information associated with said deciphered media cue for communications with said communications server, wherein said identification information associates said user device with one or more services on said communications server.

2. The method of claim 1, further comprising including said identification information in communications with said communications server.

3. The method of claim 1, wherein said one or more service is at least one of: service control, personalized data transmission, and fixed-to-mobile convergence.

4. The method of claim 1, wherein said media cue is transmitted at predetermined times in at least one of said plurality of data streams.

5. The method of claim 1, further comprising transmitting a request to said communications server that inserts said media cue into at least one of said plurality of data streams.

6. The method of claim 1, wherein said media cue is one of: an audio cue, a video cue, a two-dimensional code, a bar code, a QR code, and a matrix code.

7. A system for identifying and associating user devices, said system comprising:
a processor that:
    transfers a conference data stream to an endpoint, wherein the endpoint presents media included in the conference data stream to one or more users at a location of the endpoint;
    receives a media clip from a user device at the location, said media clip having been captured by one or more of a camera and a microphone of said user device at said location during presentation of said media by said endpoint;
    determines that said received media clip captured a media cue presented in said media by said endpoint, said media cue comprising one of an audio cue, a video cue, an audio watermark, and a video watermark included in at least a portion of said media;
    deciphers said media cue; and
    in response to deciphering said media cue, determines identification information associated with said deciphered media cue for communications with said communications server, wherein said identification information associates said user device with one or more services on said communications server.

8. The system of claim 7, wherein said processor is further configured to include said identification information in communications with said communications server.

9. The system of claim 7, wherein said processor is further configured to transmit a request to said communications server that inserts said media cue into at least one of said plurality of data streams.

10. A non-transitory computer-readable medium containing computer-executable instructions that, when executed by a processor, cause said processor to perform a method for identifying and associating user devices in a communications system, said method comprising:
    transferring a conference data stream to an endpoint, wherein the endpoint presents media included in the conference data stream to one or more users at a location of the endpoint;
    receiving a media clip from a user device at the location, said media clip having been captured by one or more of a camera and a microphone of said user device at said location during presentation of said media by said endpoint;
    determining that said received media clip captured a media cue presented in said media by said endpoint, said media cue comprising one of an audio cue, a video cue, an audio watermark, and a video watermark included in at least a portion of said media;
    deciphering said media cue; and
    in response to deciphering said media cue, determining identification information associated with said deciphered media cue for communications with said communications server, wherein said identification information associates said user device with one or more services on said communications server.

* * * * *